United States Patent
Ukon et al.

(10) Patent No.: US 11,374,874 B2
(45) Date of Patent: Jun. 28, 2022

(54) ACCESS CONTROL METHOD, ACCESS CONTROL DEVICE, AND DATA PROCESSING DEVICE

(71) Applicant: Nippon Telegraph and Telephone Corporation, Tokyo (JP)

(72) Inventors: Yuta Ukon, Tokyo (JP); Shuhei Yoshida, Tokyo (JP); Koyo Nitta, Tokyo (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 0 days.

(21) Appl. No.: 17/290,342

(22) PCT Filed: Oct. 23, 2019

(86) PCT No.: PCT/JP2019/041481
§ 371 (c)(1),
(2) Date: Apr. 30, 2021

(87) PCT Pub. No.: WO2020/095677
PCT Pub. Date: May 14, 2020

(65) Prior Publication Data
US 2021/0409344 A1    Dec. 30, 2021

(30) Foreign Application Priority Data

Nov. 6, 2018  (JP) ............................. JP2018-208717

(51) Int. Cl.
*H04L 47/80* (2022.01)
*H04L 47/6275* (2022.01)
(52) U.S. Cl.
CPC ........ *H04L 47/803* (2013.01); *H04L 47/6275* (2013.01)

(58) Field of Classification Search
CPC .......................... H04L 47/803; H04L 47/6275
See application file for complete search history.

(56) References Cited

U.S. PATENT DOCUMENTS 9,843,617 B2 * 12/2017 Maturana .............. G06F 9/5072
10,673,772 B2 *  6/2020 Shalev ................ H04L 67/1097
(Continued)

FOREIGN PATENT DOCUMENTS

CN      101436996 B   * 12/2010
CN      108055494 A   *  5/2018  ............. H04L 51/10
(Continued)

OTHER PUBLICATIONS

Ovtcharov et al., "Accelerating Deep Convolutional Neural Networks Using Specialized Hardware," Microsoft Research, Feb. 22, 2015, pp. 1-4. As discussed in specification.
(Continued)

*Primary Examiner* — Shean Tokuta
(74) *Attorney, Agent, or Firm* — Slater Matsil, LLP (57) ABSTRACT

An access control unit includes packet buffers provided for each of users, a packet identification unit that stores received packets in a corresponding packet buffer, a scheduling unit that decides a packet buffer to be the object of transfer, a transfer control unit that, in a case that updating of reference data can be performed at an application processing circuit, and also the packet buffer decided by the scheduling unit is different from the current packet buffer that is the object of transfer, updates to reference data corresponding to the packet buffer decided by the scheduling unit, and a buffer selection unit that connects the packet buffers decided to be the object of transfer to the packet transfer unit when updating of reference data is completed.

13 Claims, 7 Drawing Sheets

(56) References Cited

U.S. PATENT DOCUMENTS

| | | | | |
|---|---|---|---|---|
| 2006/0077915 A1* | 4/2006 | Takase | ............... | H04L 47/10 |
| | | | | 370/299 |
| 2016/0352652 A1* | 12/2016 | Zhou | ............... | H04L 47/621 |
| 2021/0409344 A1* | 12/2021 | Ukon | ............... | G06F 13/00 |

FOREIGN PATENT DOCUMENTS

| | | | | | | |
|---|---|---|---|---|---|---|
| JP | | 2006014242 A | * | 1/2006 | | |
| WO | WO-2018130061 A1 | * | 7/2018 | ......... | H04L 45/7453 |
| WO | WO-2020095677 A1 | * | 5/2020 | ......... | H04L 47/6275 |

OTHER PUBLICATIONS

Watanabe, et al., "Network Function Virtualization Acceleration Technique Using CPU/FPGA Tight-Coupled Architecture," DA Symposium 2016 Proceedings, 2016, pp. 116-121. As discussed in specification.

* cited by examiner

| BUFFER ID | HELD PACKET COUNT ($N_i$) | STANDBY TIME ($T_i$) | USAGE TIME ($t_i$) | PRIORITY ($P_i$) |
|---|---|---|---|---|
| 0 | 30 | 8 | 0 | 4 |
| 1 | 5 | 0 | 15 | 1 |
| 2 | 20 | 13 | 0 | 2 |
| 3 | 25 | 10 | 0 | 2 |
| 4 | 12 | 5 | 0 | 1 |
| 5 | 18 | 8 | 0 | 1 |

Fig. 7

ACCESS CONTROL METHOD, ACCESS CONTROL DEVICE, AND DATA PROCESSING DEVICE

CROSS-REFERENCE TO RELATED APPLICATIONS

This application is a national phase entry of PCT Application No. PCT/JP2019/041481, filed on Oct. 23, 2019, which claims priority to Japanese Application No. 2018-208717, filed on Nov. 6, 2018, which applications are hereby incorporated herein by reference.

TECHNICAL FIELD

The present invention relates to an access control method, an access control device, and a data processing device, for time-sharing usage of a packet-communication-based application processing circuit in a data processing device on a network.

BACKGROUND

Practical utilization of high-level services such as AI (Artificial Intelligence) and computer vision is advancing in cloud computing in recent years. Such services generally involve a great amount of calculations, making realization by software processing alone difficult, and accordingly off-loading processing with a great amount of calculations to a hardware accelerator such as a GPU (Graphics Processing Unit) or an FPGA (Field-Programmable Gate Array) is being studied (NPL 1). Particularly, FPGAs are suitable for applications that require low latency, since data paths that are optimal for the processing can be constructed.

As described above, processing delay can be reduced for applications regarding which the amount of calculations is great, by executing part of the processing with an FPGA. Now, in order to utilize an FPGA, original data (image data and so forth) from received packets needs to be reconstructed at the CPU, and thereafter the data needs to be transferred to the FPGA, which creates overhead due to preprocessing. Transferring data to the FPGA in increments of packets, and reconstructing the original data within the FPGA, is effective in resolving this overhead. The technology described in NPL 2 provides the FPGA with packet transmission/reception functions, and realizes high-speed communication between the CPU and FPGA without changing software, by the FPGA reading packets from and writing packets to a packet buffer situated in main memory or a cache.

Higher-order applications such as image processing and so forth sometimes use reference data. For example, in the frame subtraction method that is one type of image processing, a moving object is detected by comparing two pieces of image data, and the processing circuit needs to hold the image data that serves as the object of comparison. Meanwhile, application information is not taken into consideration on a network. Accordingly, packet-communication-based application processing circuits sometimes consecutively receive packets sent from different users, and there is a possibility of erroneous calculation being performed if reference data for a different user is held in the circuit. Accordingly, only one user can be allocated to one application processing circuit, and handling requests of a plurality of users requires a great amount of circuit resources.

CITATION LIST

Non Patent Literature

NPL 1 Kalin Ovtcharov, et al., "Accelerating deep convolutional neural networks using specialized hardware", Microsoft Research Whitepaper 2.11, 2015

NPL 2 Yoshikazu Watanabe et al., "Acceleration Method for Network Function Virtualization Using FPGA tightly coupled with CPU", DA symposium 2016 papers, Volume 22, p. 116-121, 2016.

SUMMARY

Technical Problem

Embodiments of the present invention have been made to solve the above problems, and it is an object thereof to provide an access control method, an access control device, and a data processing device, necessary for time-sharing usage of an application processing circuit implemented in a hardware accelerator in a data processing device in the cloud.

Means for Solving the Problem

An access control method according to embodiments of the present invention includes a first step of externally receiving a packet, a second step of identifying a user attribute of the packet received in this first step, and storing the packet in a corresponding packet buffer out of a plurality of packet buffers provided for each of users, a third step of evaluating a state of the plurality of packet buffers, and deciding a packet buffer to serve as an object of transfer, a fourth step where, in a case that updating of the reference data can be performed at an external application processing circuit that performs processing on the basis of data reconstructed from packets and the reference data that is held, and also the packet buffer decided in the third step is different from the current packet buffer that is the object of transfer, updating to reference data corresponding to the packet buffer decided in the third step is performed, and a fifth step of transferring the packet stored in the packet buffer decided in the third step to the application processing circuit when updating of the reference data is complete.

Also, in a configuration example of the access control method according to embodiments of the present invention, the third step includes a step of collecting parameters relating to the plurality of packet buffers and the application processing circuit, a step of calculating an evaluation function on the basis of the parameters, and a step of deciding a packet buffer of which the evaluation function is the largest to be the packet buffer that is the object of transfer. The parameters are a held packet count of each packet buffer, a standby time which is time elapsed from communication ending between each packet buffer and the application processing circuit, a usage time which is time elapsed from communication between the packet buffers and the application processing circuit having started, a priority set to each packet buffer, and a cost generated by updating processing of reference data at the application processing circuit.

Also, in a configuration example of the access control method according to embodiments of the present invention, the fourth step includes a step of monitoring the state of the application processing circuit, a step of evacuating reference data held in the application processing circuit to a storage unit in a case where updating of the reference data can be performed at the application processing circuit and also the packet buffer decided in the third step is different from the current packet buffer that is the object of transfer, and a step of reading reference data corresponding to the packet buffer decided in the third step from the storage unit and downloading the reference data to the application processing circuit.

Also, an access control device according to embodiments of the present invention includes a packet reception unit that externally receives packets, a plurality of packet buffers provided for each of users, a packet identification unit that identifies a user attribute of the packet received by the packet reception unit, and stores this packet in a corresponding packet buffer, a scheduling unit that evaluates a state of the plurality of packet buffers and decides a packet buffer to be the object of transfer, a transfer control unit that, in a case that updating of the reference data can be performed at an external application processing circuit that performs processing on the basis of data reconstructed from packets and the reference data that is held, and also the packet buffer decided by the scheduling unit is different from the current packet buffer that is the object of transfer, updates to reference data corresponding to the packet buffer decided by the scheduling unit, a packet transfer unit that transfers the packet stored in the packet buffer to the application processing circuit, and a buffer selection unit that connects one of the plurality of packet buffers to the packet transfer unit, and when updating of the reference data is complete, switches connection between the packet buffer and the packet transfer unit, to connect the packet buffer decided by the scheduling unit to be the object of transfer to the packet transfer unit. The packet transfer unit transfers the packet stored in the packet buffer connected by the buffer selection unit to the application processing circuit.

Also, a data processing device according to embodiments of the present invention includes an application processing circuit that performs processing on the basis of data reconstructed from packets and reference data that is held, a storage unit that stores reference data for each user, the access control device according to claim 4 or 5, that is provided to each of the application processing circuit, and a packet transfer function unit that sends an externally received packet to the access control device corresponding to the application processing circuit that is a transfer destination.

Effects of Embodiments of the Invention

In embodiments of the present invention, packets externally received at an access control device situated upstream from an application processing circuit are stored in packet buffers, having been separated according to users, and a packet buffer to communicate with an application processing circuit is selected by calculation. The access control device checks the state of the application processing circuit, updates reference data at an appropriate timing, and thereafter switches packet buffers. Accordingly, correct calculations can be performed at all times in embodiments of the present invention even if a plurality of users use a single application processing circuit at the same time.

DETAILED DESCRIPTION OF ILLUSTRATIVE EMBODIMENTS

Figure 1:
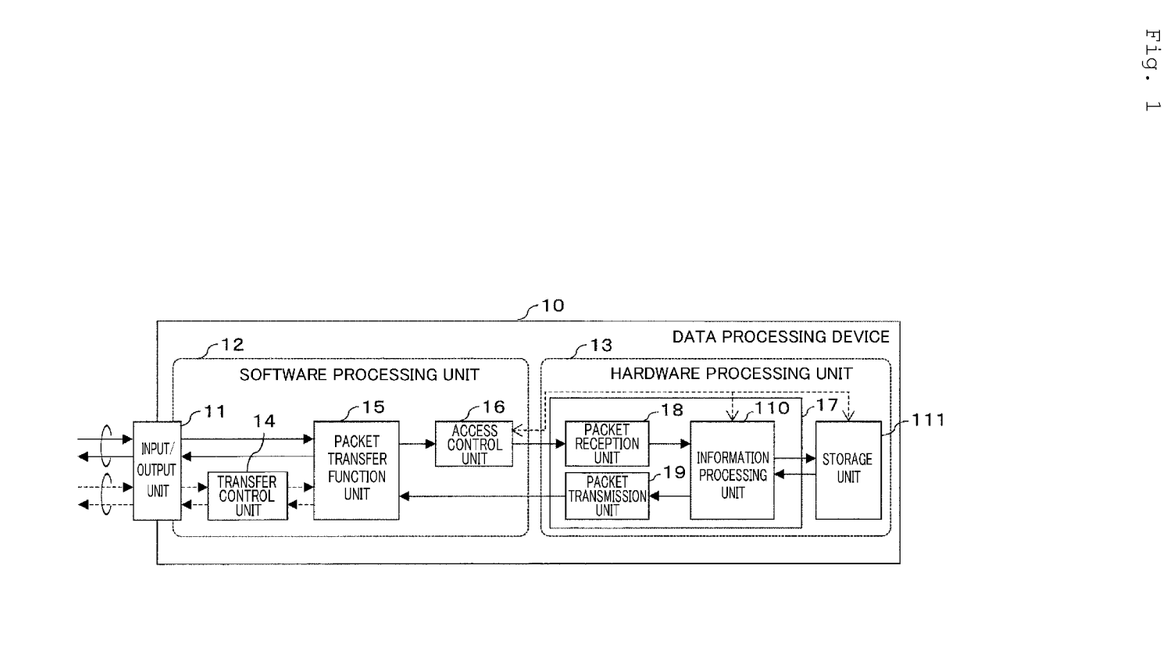
FIG. 1 is a block diagram illustrating a configuration of a data processing device according to an embodiment of the present invention.

An embodiment of the present invention will be described below in detail, with reference to the figures. FIG. 1 is a block diagram illustrating a configuration of a data processing device 10 according to the embodiment of the present invention. The data processing device 10 is configured of an input/output unit 11, a software processing unit 12, and a hardware processing unit 13.

The software processing unit 12 is configured of a transfer control unit 14, a packet transfer function unit 15, and an access control unit 16 (access control device). The hardware processing unit 13 is configured of an application processing circuit 17 and a storage unit 11. Also, the application processing circuit 17 is configured of a packet reception unit 18, a packet transmission unit 19, and an information processing unit 110.

External transmission and reception of packets at the data processing device 10 is performed through the input/output unit 11. The input/output unit 11 can be realized using a common network interface card (NIC). Packets received by the input/output unit 11 are sent to the packet transfer function unit 15.

The packet transfer function unit 15 decides transfer destination of packets on the basis of a routing table (omitted from illustration). There are virtual switches such as Open vSwitch and Lagopus (registered trademark) as existing technology to realize the packet transfer function unit 15. Note that although an example where there is one packet transfer destination is illustrated in the example in FIG. 1, there are cases where a plurality of access control units 16 and application processing circuits 17 are provided, which will be described later. In this case, the packet transfer function unit 15 sends packets to the access control unit 16 corresponding to the application processing circuit 17 that is the transfer destination of the packets.

The transfer control unit 14 has functions of performing management of a routing table for the packet transfer function unit 15, and updating the routing table on the basis of table information received externally. Accordingly, the packet transfer function unit 15 can change the transfer destination of packets as necessary.

The access control unit 16 has a role of classifying packets received from the packet transfer function unit 15 according to users, and transferring packets to the application processing circuit 17 for each user.

The packet reception unit 18 that is an element making up the application processing circuit 17 receives packets from the access control unit 16. The packet reception unit 18 performs packet order control, and processing of reconstructing original data (image data and so forth) from the received packets.

The information processing unit 110 compares reference data (e.g., reference image data that is a past image) that is held and data reconstructed by the packet reception unit 18 (e.g., current image data) for example, and performs frame subtraction processing and so forth to detect a region of a moving object in the reconstructed image.

The packet transmission unit 19 packetizes the results of processing by the information processing unit 110, and transmits the generated packet to the packet transfer function unit 15.

The storage unit 11 stores reference data for each user. This storage unit in can be realized by using on-chip RAM (Random Access Memory) or off-chip RAM.

The access control unit 16 performs control to replace reference data to be held at the information processing unit 110, out of the reference data for each user stored in the storage unit 111.

In the data processing device 10 such as described above, the input/output unit 11 and the software processing unit 12 can be realized by a common server (NIC and computer), and the hardware processing unit 13 can be realized by an FPGA board.

The application processing circuit 17 implemented in the FPGA can be rewritten, and accordingly the number and types of circuits can be changed in accordance with demand for service.

Figure 2:
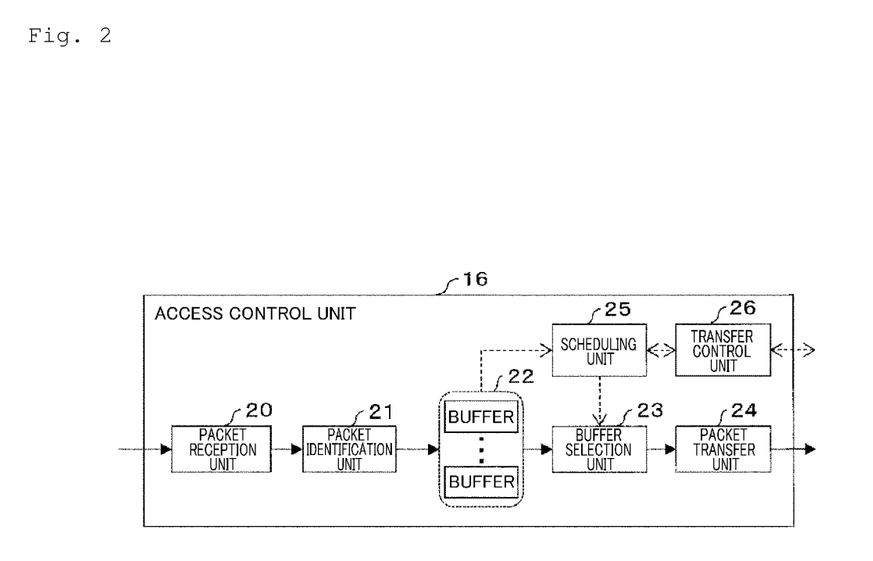
FIG. 2 is a block diagram illustrating a configuration of an access control unit according to the embodiment of the present invention.

FIG. 2 is a block diagram of the access control unit (access control device) 16 within the software processing unit 12. The access control unit 16 is configured of a packet reception unit 20, a packet identification unit 21, a plurality of packet buffers 22, a buffer selection unit 23, a packet transfer unit 24, a scheduling unit 25, and a transfer control unit 26.

The packet reception unit 20 receives packets sent from the packet transfer function unit 15. The packet identification unit 21 identifies user attributes of packets. User attributes can be identified by a port No. included in the TCP (Transmission Control Protocol) header or UDP (User Datagram Protocol) header, for example. Aside from this, methods of identifying user attributes by application information held in packets, and so forth, are also conceivable.

The packet buffers 22 are provided for each user. The packet identification unit 21 stores packets in corresponding packet buffers 22 in accordance with the identified user attributes.

The buffer selection unit 23 selects one of the plurality of packet buffers 22, and connects the selected packet buffer 22 to the packet transfer unit 24. At this time, the packet buffer 22 to be selected is decided by the scheduling unit 25. The method of deciding the packet buffer 22 will be described later.

The packet transfer unit 24 transfers the packets stored in the packet buffer 22 connected thereto by the buffer selection unit 23, to the hardware processing unit 13.

The transfer control unit 26 performs control of updating processing of reference data at the application processing circuit 17.

The access control unit 16 can be implemented as hardware as well. Further, it is thought that implementing the access control unit 16 by software enables more flexible control. For example, in a case where the number of users using the application processing circuit 17 increases, the number of packet buffers 22 needs to be increased in accordance with this increase. It is difficult to change the number of packet buffers 22 set beforehand in a hardware implementation, but the number of packet buffers 22 can easily be changed in a software implementation. Also, the scheduling unit 25 decides a packet buffer 22 to be the object of transfer using an evaluation function, and calculation with higher precision can be made with software processing, enabling more detailed control to be performed.

Figure 3:
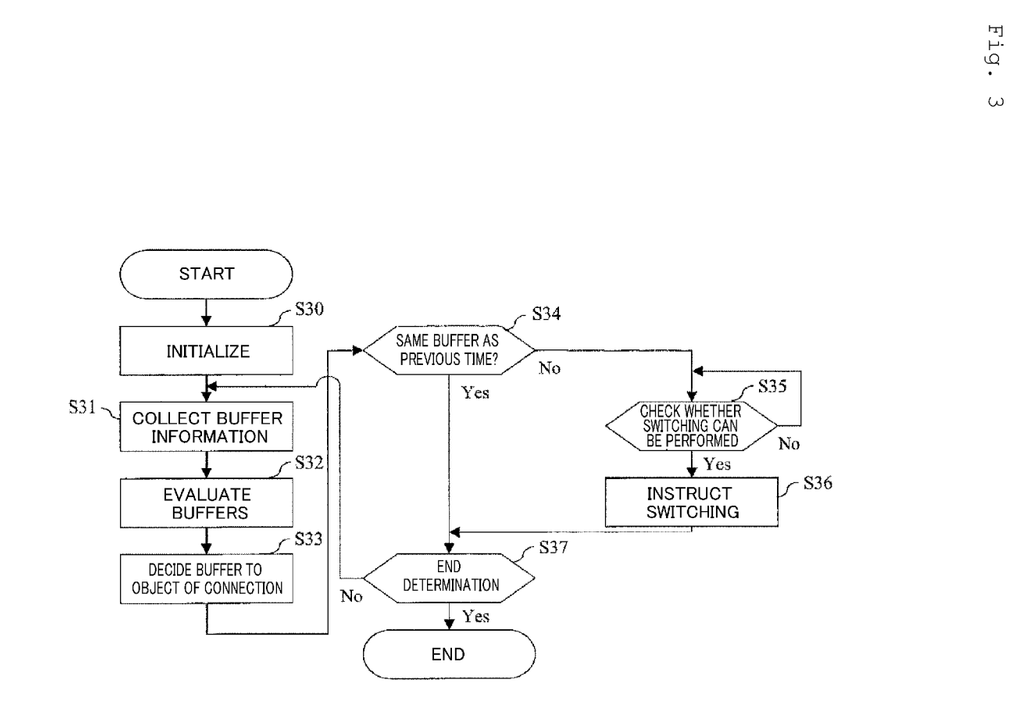
FIG. 3 is a flowchart describing operations of a scheduling unit of the access control unit according to the embodiment of the present invention.

Next, operations of the scheduling unit 25 that decides the packet buffer 22 to be the object of transfer will be described with reference to FIG. 3.

Upon starting operations, the scheduling unit 25 first initializes itself (step S30), and thereafter collects information of packet buffers 22 (step S31). Thereafter, the scheduling unit 25 evaluates the state of the packet buffers 22 on the basis of the collected information (step S32), and decides the packet buffer 22 of which the evaluation function is the greatest to be the packet buffer that is the object of transfer (step S33). The information collected from the packet buffers 22 and the method of evaluating the packet buffers 22 will be described later.

In a case where the packet buffer 22 decided in step S33 is the same as the packet buffer 22 decided the previous time (Yes in step S34), the scheduling unit 25 does not perform communication between the buffer selection unit 23 and the transfer control unit 26, and the flow advances to end determination of operations (step S37). In this case, the connection between the currently-connected packet buffer 22 and packet transfer unit 24 is maintained without change.

Also, in a case where the packet buffer 22 decided in step S33 is not the same as the packet buffer 22 decided the previous time (No in step S34), the scheduling unit 25 notifies the transfer control unit 26 of the packet buffer 22 decided in step S33, and queries whether or not switching of packet buffers 22 can be performed (step S35). The scheduling unit 25 goes into a standby state until a reply to the query is received from the transfer control unit 26.

When a reply is received to the effect that switching of packet buffers 22 can be performed (updating of reference data is complete) from the transfer control unit 26 (Yes in step S35), the scheduling unit 25 notifies the buffer selection unit 23 of the packet buffer 22 decided in step S33 (step S36). In response to this notification, the buffer selection unit 23 switches the connection between the packet buffers 22 and the packet transfer unit 24 so as to connect the packet buffer 22 regarding which notification has been made by the scheduling unit 25 to the packet transfer unit 24.

The scheduling unit 25 then performs end determination (step S37). In a case of ending operations of the data processing device 10 for example, operations of the scheduling unit 25 also end. If not Information of the packet buffers 22 that the scheduling unit 25 collects will be described with reference to FIG. 4. Information of the packet buffers 22 is held within the scheduling unit 25 in the format of an evaluation table 40 illustrated in FIG. 4. The following five types of information are stored in the evaluation table 40. The first is a unique buffer ID assigned to each packet buffer 22. The second is a held packet count $N_i$ of each packet buffer 22. The third is a standby time $T_i$ of time elapsed after communication between each packet buffer 22 and the application processing circuit 17 has ended. The fourth is a usage time $t_i$ of time elapsed after communication between each packet buffer 22 and the application processing circuit 17 has started. The fifth is a priority $P_i$ set to each packet buffer 22.

Figure 4:
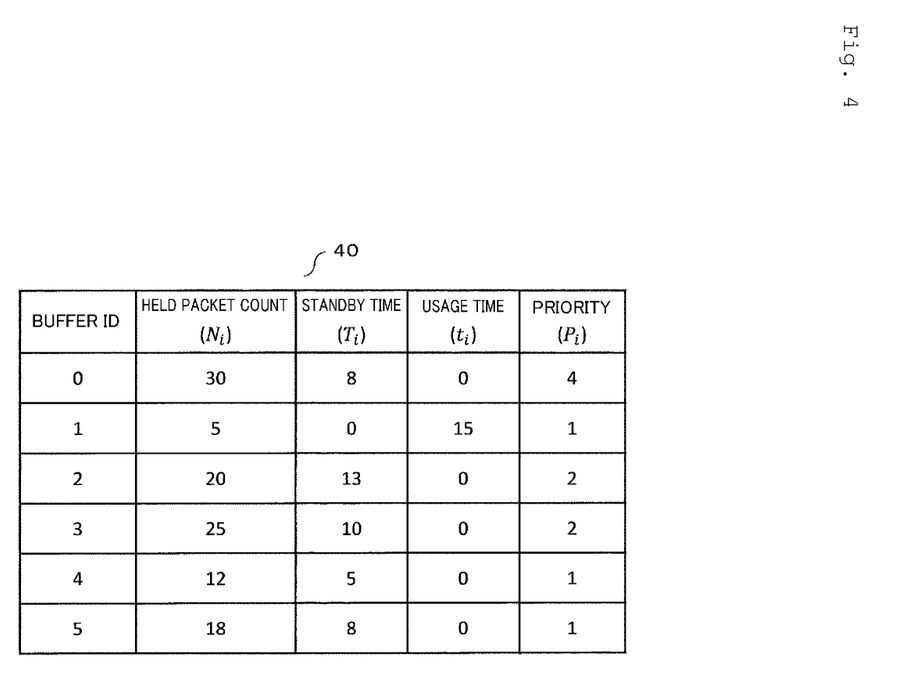
FIG. 4 is a diagram illustrating information in a packet buffer that is collected by the scheduling unit of the access control unit according to the embodiment of the present invention.

The buffer ID is a parameter that is updated when a packet buffer 22 is added or deleted. The priority $P_i$ is a parameter for performing QoS (Quality of Service) control. An arrangement is assumed where the priority $P_i$ is set in advance, but can be changed dynamically while the scheduling unit 25 is operating. The held packet count $N_i$ is a parameter that can be acquired by checking the region of each packet buffer 22.

Also, the standby time $T_i$ and usage time $t_i$ can be acquired by monitoring the state of each packet buffer 22 and measuring elapsed time. Note that only one packet buffer 22 is connected to the packet transfer unit 24 by the buffer selection unit 23, and accordingly only the usage time $t_i$ of the packet buffer 22 currently connected to the packet transfer unit 24 is updated. At this time, the usage times $t_i$ of the packet buffers 22 not connected to the packet transfer unit 24 are all 0. Also, the standby times $T_i$ of the packet buffers 22 not connected to the packet transfer unit 24 are updated, and only the standby time $T_i$ of the packet buffer 22 that is currently connected is 0.

Part or all of the held packet count $N_i$, standby time $T_i$, usage time $t_i$, and priority $P_i$ illustrated in FIG. 4 are used by an evaluation function f to evaluate the packet buffers 22 and decide a packet buffer 22 to communicate with the application processing circuit 17. It is conceivable that the importance of these parameters will change depending on usage cases, and accordingly the evaluation function f is preferably set for each usage case. An evaluation function f that is a linear function will be described as an example.

With C representing the cost necessary to switch reference data in the application processing circuit 17, the evaluation function f(i) of a packet buffer 22 of which the buffer ID is i can be found by the following Expression (1), from the held packet count $N_i$, standby time $T_i$, priority $P_i$, usage time $t_i$, and cost C of the packet buffer 22.

$$f(i) = \alpha_1 \times N_i + \alpha_2 \times T_i + a_3 \times P_i - \alpha_4 \times t_i - C \quad (1)$$

Here, $\alpha_1$ through $\alpha_4$ are coefficients for weighting (weighting coefficients). As one example, the weighting coefficients $\alpha_1$ through $\alpha_4$ are all 1, and the cost C is 1. At this time, the largest evaluation function f(i) of Expression (1) with regard to the evaluation table 40 in FIG. 4 is when the buffer ID i=0, and the evaluation function f(0) is 41(=30+8+4−0−1). In this case, the scheduling unit 25 decides the packet buffer 22 where the buffer ID i=0, as the packet buffer 22 to be selected.

The i=0 packet buffer 22 decided by the scheduling unit 25 is connected to the packet transfer unit 24 by the buffer selection unit 23. Accordingly, the held packet count $N_0$ of this packet buffer 22 decreases over time, and the usage time $t_0$ of this packet buffer 22 increases. Meanwhile, the held packet counts $N_i$ of the other packet buffers 22 increase. Accordingly, it is conceivable that the packet buffer 22 of which the evaluation function f(i) is largest will change partway through, and at a certain timing, another packet buffer 22 will be selected as the packet buffer 22 to be the object of transfer.

Figure 5:
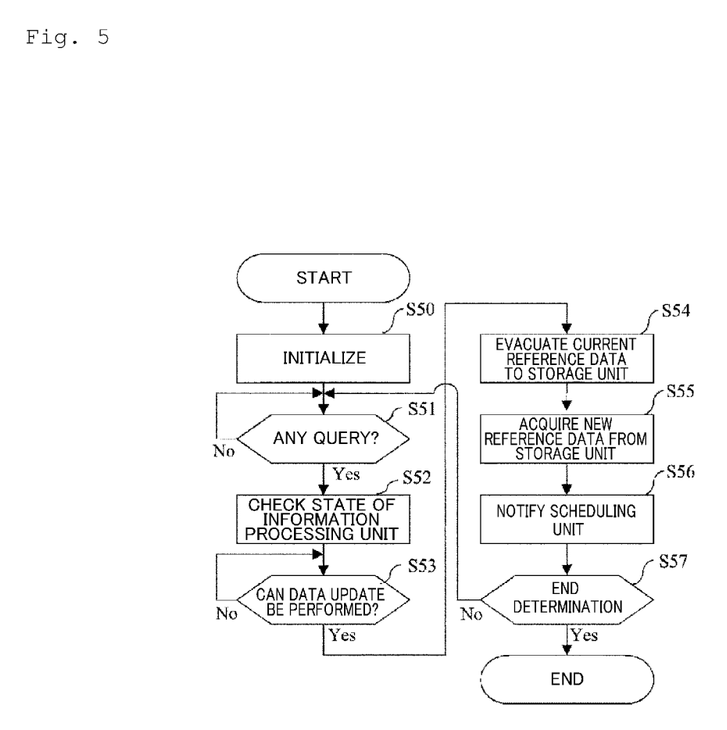
FIG. 5 is a flowchart describing operations of a transfer control unit of the access control unit according to the embodiment of the present invention.

Next, operations of the transfer control unit 26 updating the reference data in the information processing unit 110 at the timing of packet buffers 22 switching will be described with reference to FIG. 5.

Upon starting operations, the transfer control unit 26 first initializes itself (step S50), and thereafter goes into a standby state until a query arrives from the scheduling unit 25 (step S51).

At the point of having received a query from the scheduling unit 25 regarding whether or not switching of packet buffers 22 can be performed (Yes in step S51), the transfer control unit 26 checks the state of the information processing unit 110 (step S52), and determines whether or not update of reference data can be performed (step S53).

In a case when the information processing unit 110 is performing processing using reference data, reference data cannot be updated. In a case where reference data cannot be updated, the transfer control unit 26 goes into standby. Conversely, at the point of processing by the information processing unit 110 using reference data ending, reference data can be updated, so the transfer control unit 26 performs control to evacuate the reference data held in the information processing unit 110 to the storage unit 11 (step S54).

Thereafter, the transfer control unit 26 reads the reference data corresponding to the packet buffer 22 (user) that the scheduling unit 25 has decided to be the object of transfer from the storage unit in, downloads to the information processing unit 110 (step S55), and notifies the scheduling unit 25 that switching of packet buffers 22 can be performed (step S56).

Finally, the transfer control unit 26 performs end determination (step S57). In a case where operations of the data processing device 10 are to be ended, for example, operations of the transfer control unit 26 end as well. If not ending, the flow returns to step S51.

According to the above operations, the access control unit manages packets for each user, and performs updating a reference data at appropriate timings, thereby enabling correct calculations to be performed at all times even if packets belonging to different users are transferred to the application processing circuit 17.

Figure 6:
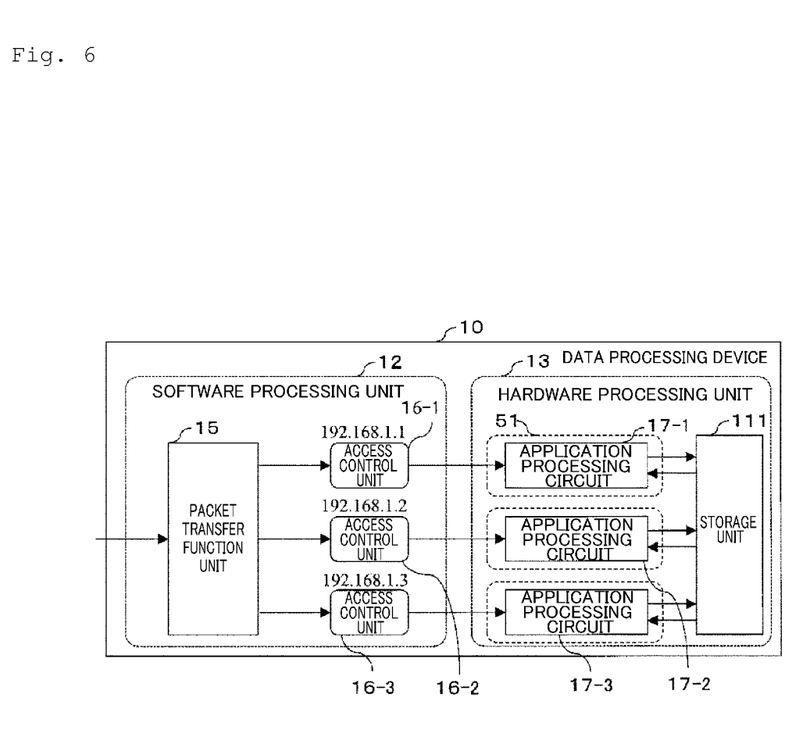
FIG. 6 is a block diagram illustrating a specific example of the data processing device according to the embodiment of the present invention.

In closing, a specific example of the data processing device 10 in a case of using the access control unit 16 according to the present embodiment is illustrated in FIG. 6. This example in FIG. 6 illustrates a case where a plurality of application processing circuits 17-1 through 17-3 that perform different processing are implemented in the hardware processing unit 13. Note that the input/output unit 11 and the transfer control unit 14 within the software processing unit 12 are omitted from illustration in FIG. 6.

Access control units 16-1 through 16-3 are provided corresponding to each of the application processing circuits 17-1 through 17-3. IP addresses are assigned to the access control units 16-1 through 16-3. In the example in FIG. 6, the IP address of the access control unit 16-1 is "192.168.1.1", the IP address of the access control unit 16-2 is "192.168.1.2", and the IP address of the access control unit 16-3 is "192.168.1.3".

The packet transfer function unit 15 can judge which access control unit 16-1 through 16-3 to transfer a packet to (i.e., which application processing circuit 17-1 through 17-3 to transfer the packet to), by confirming the IP address described in the header of the packet received by the input/output unit 11.

Also, the application processing circuits 17-1 through 17-3 can be implemented in a reconfigurable region 51 of the FPGA, and in this case can be dynamically rewritten in increments of the application processing circuits 17-1 through 17-3. The reconfigurable region 51 can be realized by using a partial reconfiguration function of the FPGA, for example. Using such a configuration enables the types and number of application processing circuits 17-1 through 17-3 to be flexibly changed in accordance with the usage states of various types of services.

Figure 7:
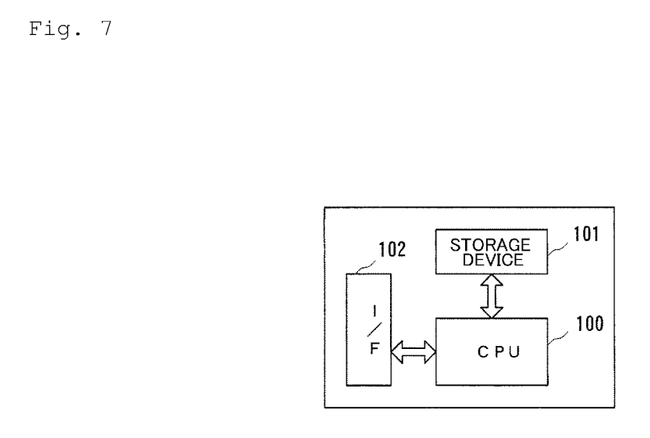
FIG. 7 is a block diagram illustrating a configuration example of a computer that realizes a software processing unit of the data processing device according to the embodiment of the present invention.

The software processing unit 12 described in the present embodiment can be realized by a computer having a CPU (Central Processing Unit), a storage device, and an interface, and a program that controls these hardware resources. FIG. 7 illustrates a configuration example of this computer. The computer is provided with a CPU 100, a storage device 101, and an interface device (hereinafter abbreviated to I/F) 102. Connected to the I/F 102 are the input/output unit 11 (NIC), the hardware processing unit 13, and so forth. In such a computer, the program for realizing the access control method according to embodiments of the present invention is stored in the storage device 101. The CPU 100 executes the processing of the software processing unit 12 (access control device) described in the present embodiment, following the program stored in the storage device 101.

INDUSTRIAL APPLICABILITY

Embodiments of the present invention can be applied to technology using a data processing device on a network.

REFERENCE SIGNS LIST

10 Data processing device
11 Input/output unit
12 Software processing unit
13 Hardware processing unit
14 Transfer control unit
15 Packet transfer function unit
16 Access control unit
17 Application processing circuit
18 Packet reception unit
19 Packet transmission unit
110 Information processing unit
111 Storage unit
20 Packet reception unit
21 Packet identification unit
22 Packet buffer
23 Buffer selection unit
24 Packet transfer unit
25 Scheduling unit
26 Transfer control unit
51 Reconfigurable region

The invention claimed is:

1. An access control method, comprising:
externally receiving, by an access control device, a first packet;
identifying a first user attribute of the first packet;
storing the first packet in a corresponding packet buffer of a plurality of packet buffers according to the first user attribute, wherein each of the plurality of packet buffers are provided for a corresponding user of a plurality of users;
evaluating a state of the plurality of packet buffers; and
in response to evaluating the state of the plurality of packet buffers, deciding a first packet buffer of the plurality of packet buffers to serve as an object of transfer;
in response to updating of reference data being performable at an application processing circuit configured to perform processing based on data reconstructed from packets and the reference data and in response to the first packet buffer being different from a second packet buffer that currently is the object of transfer, updating the reference data to correspond to the first packet buffer; and
transferring a second packet stored in the first packet buffer to the application processing circuit when updating of the reference data to correspond to the first packet buffer is completed.

2. The access control method according to claim 1, wherein:
evaluating the state of the plurality of packet buffers comprises:
collecting parameters relating to the plurality of packet buffers and the application processing circuit; and
calculating evaluation functions for the plurality of packet buffers, wherein calculating the evaluation functions comprises calculating a respective evaluation function for each of the plurality of packet buffers based on the parameters; and
deciding the first packet buffer of the plurality of packet buffers to serve as the object of transfer comprises:
deciding the first packet buffer of the plurality of packet buffers to serve as the object of transfer when a first evaluation function corresponding to the first packet buffer is the largest among the evaluation functions of the plurality of packet buffers.

3. The access control method according to claim 2, wherein the parameters comprise a held packet count of each of the plurality of packet buffers, a time elapsed from communication ending between each of the plurality of packet buffers and the application processing circuit, a time elapsed from communication between each of the plurality of packet buffers and the application processing circuit having started, a priority set to each of the plurality of packet buffers, and a cost generated by updating processing of reference data at the application processing circuit.

4. The access control method according to claim 1, wherein updating the reference data to correspond to the first packet buffer comprises:
monitoring a state of the application processing circuit;
evacuating second reference data held in the application processing circuit to a memory when updating of the reference data is performable at the application processing circuit and the first packet buffer is different from the second packet buffer that is the object of transfer; and
reading first reference data corresponding to the first packet buffer from the memory and updating the reference data with the first reference data by downloading the first reference data to the application processing circuit.

5. An access control device, comprising:
a packet receiver configured to externally receive packets;
a plurality of packet buffers configured to store each of the packets in a corresponding packet buffer of the plurality of packet buffers, wherein each of the plurality of packet buffers are provided for a corresponding user of a plurality of users;
a scheduler configured to:
evaluate a state of the plurality of packet buffers; and
in response to evaluating the state of the plurality of packet buffers, decide a first packet buffer of the plurality of packet buffers to serve as an object of transfer;
a transfer controller configured to in response to updating of reference data being performable at an application processing circuit configured to perform processing based on data reconstructed from packets and the reference data and in response to the first packet buffer being different from a second packet buffer that currently is the object of transfer, update the reference data to correspond to the first packet buffer; and a packet transferor configured to transfer a first packet stored in the first packet buffer to the application processing circuit when updating the reference data to correspond to the first packet buffer is completed.

6. The access control device according to claim 5, wherein the scheduler is configured to:
collect parameters relating to the plurality of packet buffers and the application processing circuit;
calculate evaluation functions for the plurality of packet buffers, wherein calculating the evaluation functions comprises calculating a respective evaluation function for each of the plurality of packet buffers based on the parameters; and
decide the first packet buffer of the plurality of packet buffers to serve as the object of transfer when a first evaluation function corresponding to the first packet buffer is the largest among the evaluation functions of the plurality of packet buffers.

7. The access control device according to claim 6, wherein the parameters comprise a held packet count of each of the plurality of packet buffers.

8. The access control device according to claim 6, wherein the parameters comprise a time elapsed from communication ending between each of the plurality of packet buffers and the application processing circuit.

9. The access control device according to claim 6, wherein the parameters comprise a time elapsed from communication between each of the plurality of packet buffers and the application processing circuit having started.

10. The access control device according to claim 6, wherein the parameters comprise a priority set to each of the plurality of packet buffers.

11. The access control device according to claim 6, wherein the parameters comprise a cost generated by updating processing of reference data at the application processing circuit.

12. The access control device according to claim 5, wherein the transfer controller is configured to:

evacuate second reference data held in the application processing circuit to a memory when updating of the reference data is performable at the application processing circuit and the first packet buffer is different from the second packet buffer that is the object of transfer; and reading first reference data corresponding to the first packet buffer from the memory and updating the reference data with the first reference data by downloading the first reference data to the application processing circuit.

13. A data processing device, comprising:
an application processing circuit configured to processing based on data reconstructed from packets and stored reference data;
a memory configured to store reference data for each of a plurality of users;
an access control device comprising:
a packet receiver configured to externally receive the packets;
a plurality of packet buffers configured to store each of the packets in a corresponding packet buffer of the plurality of packet buffers, wherein each of the plurality of packet buffers are provided for a corresponding user of a plurality of users;
a scheduler configured to:
evaluate a state of the plurality of packet buffers; and
in response to evaluating the state of the plurality of packet buffers, decide a first packet buffer of the plurality of packet buffers to serve as an object of transfer;
a transfer controller configured to in response to the first packet buffer being different from a second packet buffer that currently is the object of transfer, update the stored reference data to correspond to the first packet buffer; and
a packet transferor configured to transfer a first packet stored in the first packet buffer to the application processing circuit when updating the stored reference data to correspond to the first packet buffer is completed.

* * * * *